(12) United States Patent
Pogoda

(10) Patent No.: US 8,710,344 B2
(45) Date of Patent: Apr. 29, 2014

(54) PIANO KEYBOARD WITH KEY TOUCH POINT DETECTION

(76) Inventor: Gary S. Pogoda, Atlantic City, NJ (US)

( * ) Notice: Subject to any disclaimer, the term of this patent is extended or adjusted under 35 U.S.C. 154(b) by 0 days.

(21) Appl. No.: 13/491,045

(22) Filed: Jun. 7, 2012

(65) Prior Publication Data

US 2013/0327200 A1    Dec. 12, 2013

(51) Int. Cl.
*G10H 1/18* (2006.01)
(52) U.S. Cl.
USPC .............................. 84/615; 84/653
(58) Field of Classification Search
USPC .................................. 84/615, 653
See application file for complete search history.

(56) References Cited

U.S. PATENT DOCUMENTS

| | | | | | |
|---|---|---|---|---|---|
| 4,778,951 | A  * | 10/1988 | Pepper et al. | ............... | 178/18.01 |
| 5,425,297 | A  * | 6/1995 | Young, Jr. | ............... | 84/483.2 |
| 5,559,301 | A  * | 9/1996 | Bryan et al. | ............... | 84/653 |
| 5,889,236 | A  * | 3/1999 | Gillespie et al. | ............ | 178/18.01 |
| 7,453,035 | B1 * | 11/2008 | Evans et al. | ................ | 84/477 R |
| 8,516,386 | B2 * | 8/2013 | Adam et al. | ................... | 715/773 |
| 2004/0007116 | A1 * | 1/2004 | Marcus | ............... | 84/10 |
| 2006/0032364 | A1 * | 2/2006 | Ludwig | ............ | 84/723 |
| 2006/0090632 | A1 * | 5/2006 | Ludwig | ............ | 84/645 |
| 2009/0199699 | A1 * | 8/2009 | Marcus | ............ | 84/723 |
| 2009/0213091 | A1 * | 8/2009 | Davidovici et al. | ............ | 345/174 |
| 2009/0256817 | A1 * | 10/2009 | Perlin et al. | .................... | 345/174 |
| 2010/0053105 | A1 * | 3/2010 | Choi | ............... | 345/173 |
| 2010/0288108 | A1 * | 11/2010 | Jung et al. | ................ | 84/610 |
| 2011/0100198 | A1 * | 5/2011 | Gatzsche et al. | ............... | 84/615 |
| 2011/0316793 | A1 * | 12/2011 | Fushiki | ................ | 345/173 |
| 2011/0316888 | A1 * | 12/2011 | Sachs et al. | .................... | 345/667 |
| 2012/0011438 | A1 * | 1/2012 | Kim et al. | ................ | 715/702 |
| 2012/0139861 | A1 * | 6/2012 | Jung et al. | .................... | 345/173 |
| 2012/0144977 | A1 * | 6/2012 | Morrissey et al. | ............... | 84/602 |
| 2012/0166995 | A1 * | 6/2012 | McAleer | ................ | 715/773 |
| 2012/0297962 | A1 * | 11/2012 | O'Donnell et al. | ............ | 84/645 |
| 2012/0311466 | A1 * | 12/2012 | Kluttz et al. | ................ | 715/760 |
| 2013/0002585 | A1 * | 1/2013 | Jee et al. | .................... | 345/173 |
| 2013/0141351 | A1 * | 6/2013 | Aisaka et al. | ................ | 345/173 |
| 2013/0180385 | A1 * | 7/2013 | Hamilton et al. | ............... | 84/603 |
| 2013/0205976 | A1 * | 8/2013 | Ludwig | ............ | 84/606 |
| 2013/0263721 | A1 * | 10/2013 | Shavit | ............ | 84/626 |
| 2013/0275907 | A1 * | 10/2013 | Lau et al. | .................... | 715/773 |
| 2013/0300674 | A1 * | 11/2013 | Davidson | ............ | 345/173 |

FOREIGN PATENT DOCUMENTS

JP        01-225999        9/1989

* cited by examiner

*Primary Examiner* — David S. Warren
(74) *Attorney, Agent, or Firm* — Norman E. Lehrer

(57) ABSTRACT

The present invention relates to an application for an iPad or similar electronic device having a touch screen. It provides a sensor to detect the touch position along the vertical length of a key as it is being engaged and to then offset the notes of the keyboard accordingly. This enables several octaves of notes to be accessed on the touch screen at any given time with a key size that is sufficient for real time playing. This arrangement further enables the incremental offset of the note pitches in a continuous manner to emulate the "string stretching" and "fretless neck" techniques of guitars and basses. The invention further provides a screen overlay to physically define the borders and travel of the on-screen keys thereby emulating the tactile feedback of real keys, again in a manner sufficient for real time playing.

11 Claims, 10 Drawing Sheets

Figure 3

PIANO KEYBOARD WITH KEY TOUCH POINT DETECTION

BACKGROUND OF THE INVENTION

The present invention is directed toward a piano keyboard, and more particularly, toward a piano keyboard having key touch point detection. While the invention is particularly applicable to piano keyboards displayed and playable on an electronic device having a touch screen, the invention also results in a keyboard of reduced physical size and with a simplified arrangement of keyboard keys, so it is not beyond the scope of the invention to apply the same to more mechanical keys with electronics for activating, generating, or reproducing tones.

There are numerous downloadable piano keyboard applications for electronic devices such as iPads, Droids, Kindles, and the like. However, due to the small size of the screens of these devices in comparison to the physical size of an actual keyboard, the number of on-screen keys available for playing in real time is seriously limited.

To compensate for this small screen size, these applications typically employ three solutions. The first is to reduce the width of the keyboard keys to allow a greater number of them to appear simultaneously on the screen. The second is to reduce the length of the keyboard keys to allow multiple rows of keys to appear simultaneously on the screen. The third solution is to implement a swiping maneuver to reposition the keyboard keys to the left or right while playing in order to access those additional keys that would normally be positioned off-screen.

While these techniques do serve to increase the number of keyboard keys available for playing at any given time, they also greatly increase the difficulty of playing due to the reduced key size and the additionally required maneuvers. Adding to this the lack of tactile feedback that is inherent in touch screen keyboards, these applications become impossible to play music in real time.

There is, therefore, a need for an application for iPads and similar electronic devices that displays a piano-like keyboard and provides means for allowing a user to easily utilize the same in a manner closer to a standard size keyboard.

SUMMARY OF THE INVENTION

The present invention provides a sensor means to detect the touch position along the vertical length of a key as it is being engaged and to then offset the notes of the keyboard accordingly. This enables several octaves of notes to be accessed on the touch screen at any given time with a key size that is sufficient for real time playing. This arrangement also enables the programming of the note offsets to conform to the notes of a selected musical key, while still allowing for specialized programming of the same to accommodate a limited playing of nonconforming notes, as would be needed for the playing of a song that momentarily strays from its designated musical key. This arrangement further enables the incremental offset of the note pitches in a continuous manner to emulate the "string stretching," "whammy bar," and "fretless neck" techniques of guitars and basses. The invention further provides a screen overlay to physically define the borders and travel of the on-screen keys thereby emulating the tactile feedback of real keys, again in a manner sufficient for real time playing.

BRIEF DESCRIPTION OF THE DRAWINGS

For the purpose of illustrating the invention, there are shown in the accompanying drawings forms that are presently preferred; it being understood that the invention is not intended to be limited to the precise arrangements and instrumentalities shown.

FIG. 3 is a top view of a third and fourth operational state of the first keyboard embodiment shown in FIGS. 1 and 2;

DETAILED DESCRIPTION OF THE PREFERRED EMBODIMENT

Figure 1:
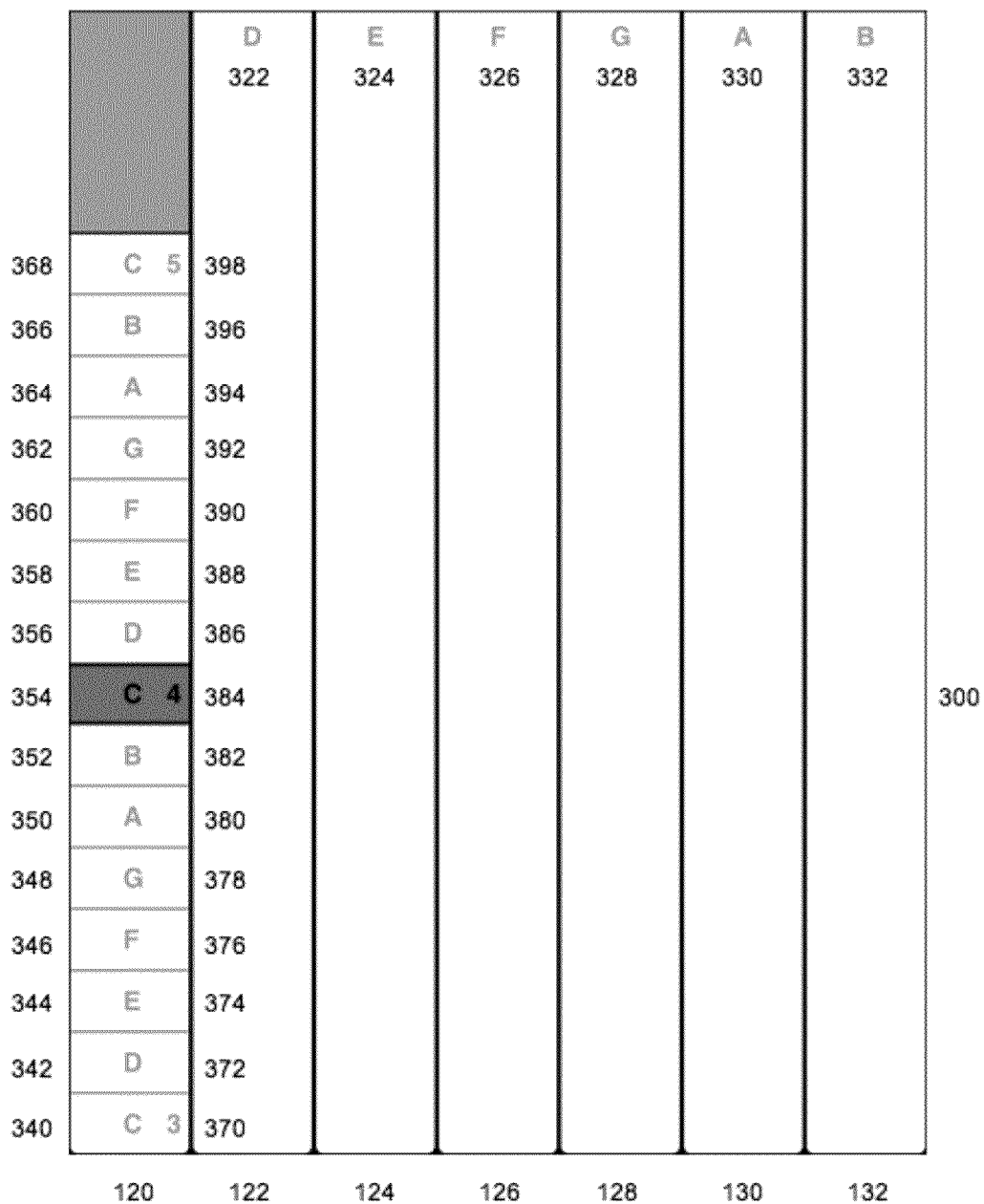
FIG. 1 is a top view of a first operational state of a first embodiment of a piano-type, touchscreen keyboard of the invention.

Referring now to the drawings in detail wherein like reference numerals have been used throughout the various figures to designate like elements, there is shown in FIG. 1 a first operational state of a first embodiment of an iPad piano-type, touchscreen keyboard of the invention designated generally as 300. Embodiment 300 is comprised of seven full-sized piano white keys 120, 122, 124, 126, 128, 130, and 132 arranged across the full portrait width of the screen.

The first white key 120 is divided lengthwise into fifteen equal sections 340, 342, 344, 346, 348, 350, 352, 354, 356, 358, 360, 362, 364, 366, and 368. The notes 370, 372, 374, 376, 378, 380, 382, 384, 386, 388, 390, 392, 394, 396, and 398 played by the touching of those sections are set to the first 15 notes (C3-D-E-F-G-A-B-C4-D-E-F-G-A-B-C5) of the extended note sequence (C3-D-E-F-G-A-B-C4-D-E-F-G-A-B-C5-D-E-F-G-A-B) which corresponds to an initial center octave of 4 and musical key of C major. The notes 384, 322, 324, 326, 328, 330, 332 played by the touching of the white keys are set to the note sequence (C4-D-E-F-G-A-B) from the above extended note sequence starting with note (C4) 384 of the initially touched section 354 of the first white key 120.

Figure 2:
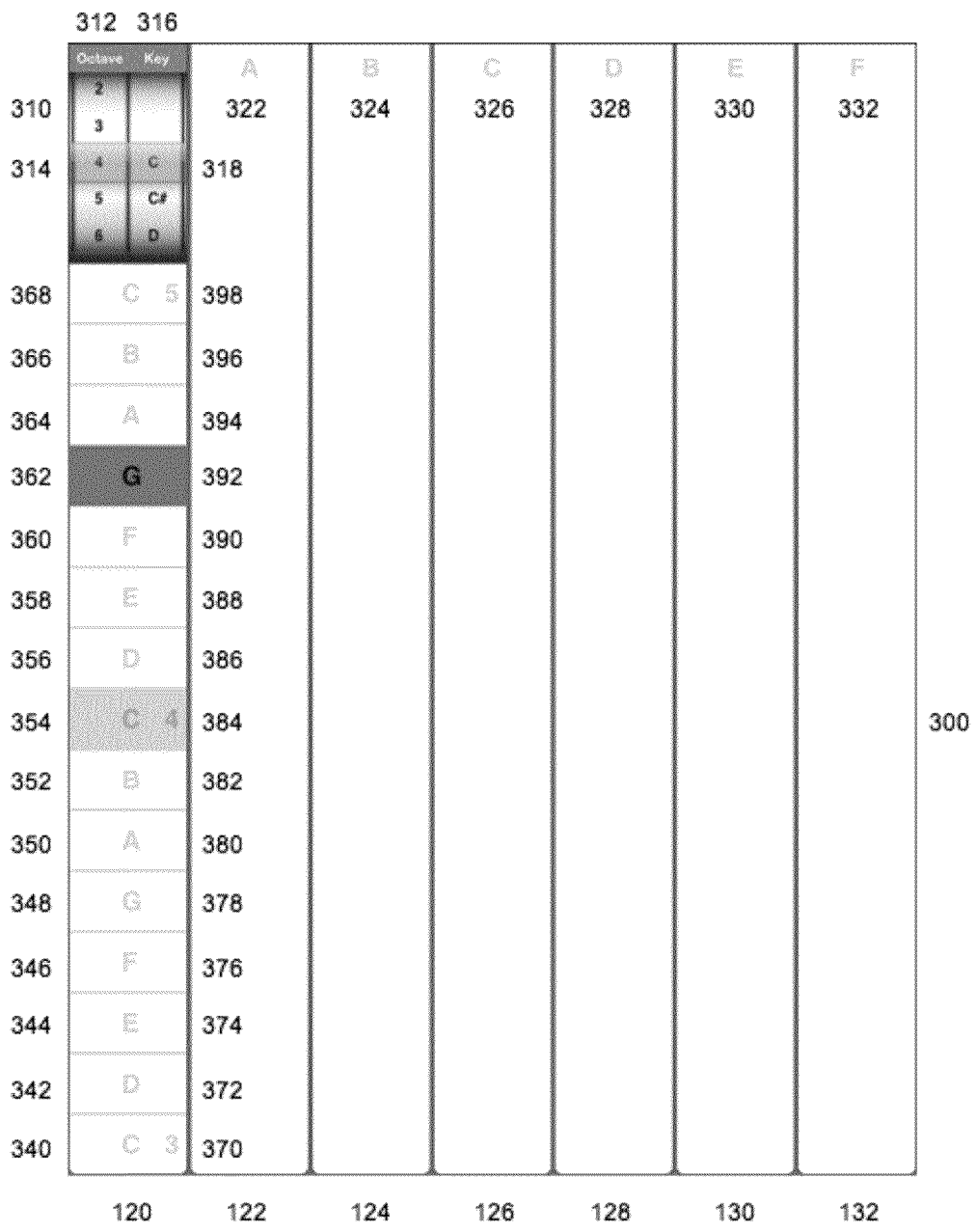
FIG. 2 is a top view of a second operational state of the first keyboard embodiment shown in FIG. 1.

FIG. 2 shows a second operational state of the above first embodiment 300. In this state, the touching of a different section 362 accordingly shifts the notes 392, 322, 324, 326, 328, 330, and 332 played by the touching of the white keys 120, 122, 124, 126, 128, 130, and 132 to the note sequence (G-A-B-C5-D-E-F) from the above extended note sequence starting with the note (G4) 392 of the touched section 362 of the first white key 120. And as further shown in FIG. 2, this embodiment is further comprised of a pop-up data picker 310 with a control wheel 312 to select the current center octave (4) 314, in combination with a control wheel 316 to select the current musical key (C major) 318. This combination is used to determine the notes and octave range of the above extended note sequence, thereby providing 3 selectable octaves of full-sized piano white keys, available for playing in the selected musical key, at any given time.

Figure 3:
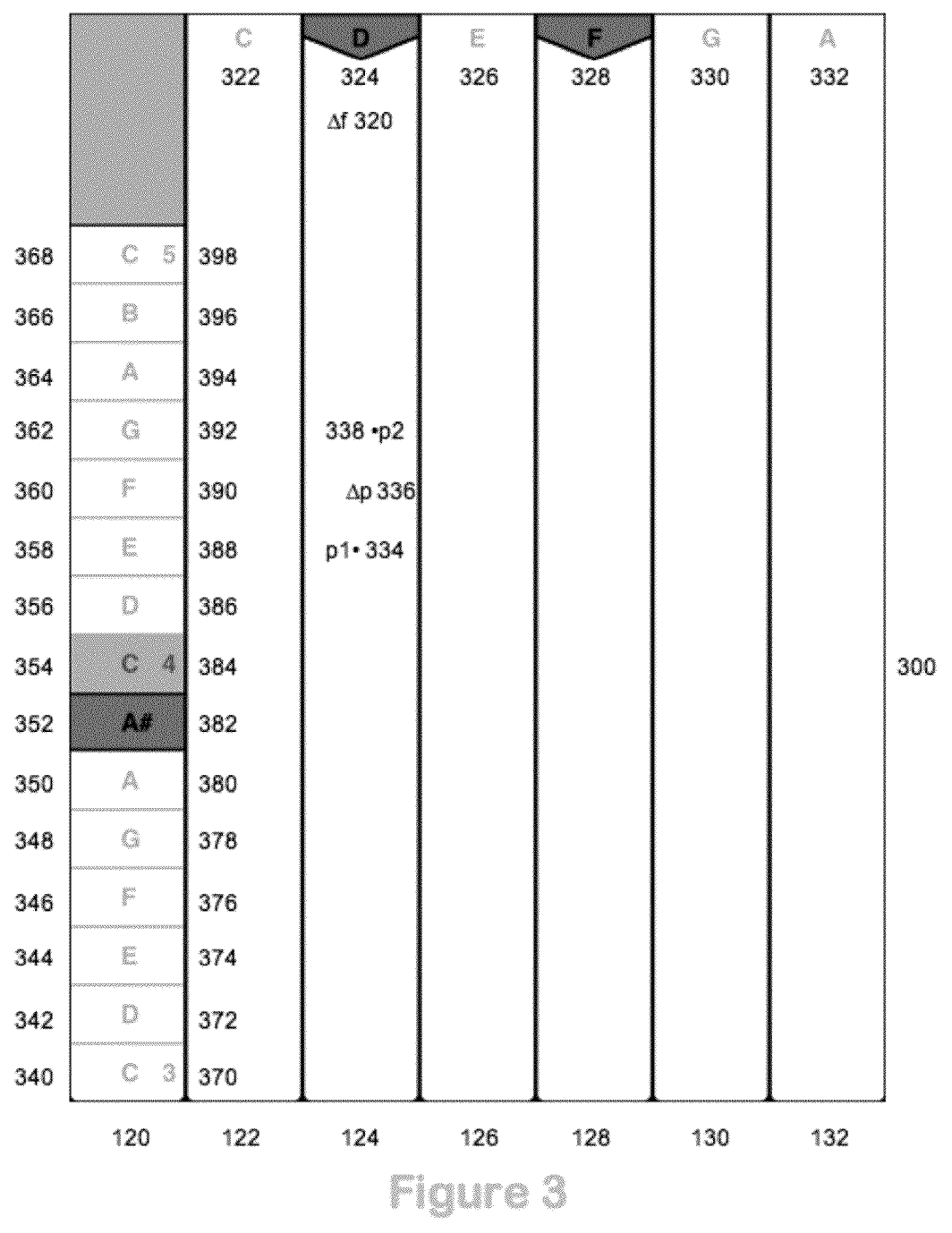

Referring now to FIG. 3, there is shown a third operational state of the above first embodiment 300 corresponding to an initial center octave of 4 and musical key of C major. In this state, the designated combination of three touched keys 120, 124, and 128 produces the three notes (A#3) 382, (D4) 324, and (F4) 328, and where the first note (A#3) 382 for section 352 of the first white key 120 does not conform to the current musical key of C major, but has been programmed to replace the conforming note (B3) normally played by that section 352, so as to enable, in a limited fashion, the playing of notes outside the set of notes conforming to the current center octave and musical key, while using the same keyboard keys that would normally play only conforming notes.

A fourth operational state of the first embodiment 300 of the invention is illustrated again with reference to FIG. 3. As can be seen, there is additionally shown a first touch position (p1) 334 of key 324, a subsequent deviation (Δρ) 336 from that touch position 334 to a second touch position (p2) 338, that deviation 336 occurring while the touch is continually maintained. This results in a corresponding frequency deviation (Δf) 320 in the pitch of the note 324 being played, and whereby continued similar such touch position deviations result in similarly corresponding pitch deviations for as long as that touch is maintained, thus enabling the emulation of the string stretching, whammy bar, and fretless neck techniques of guitar and bass playing.

Figure 4:
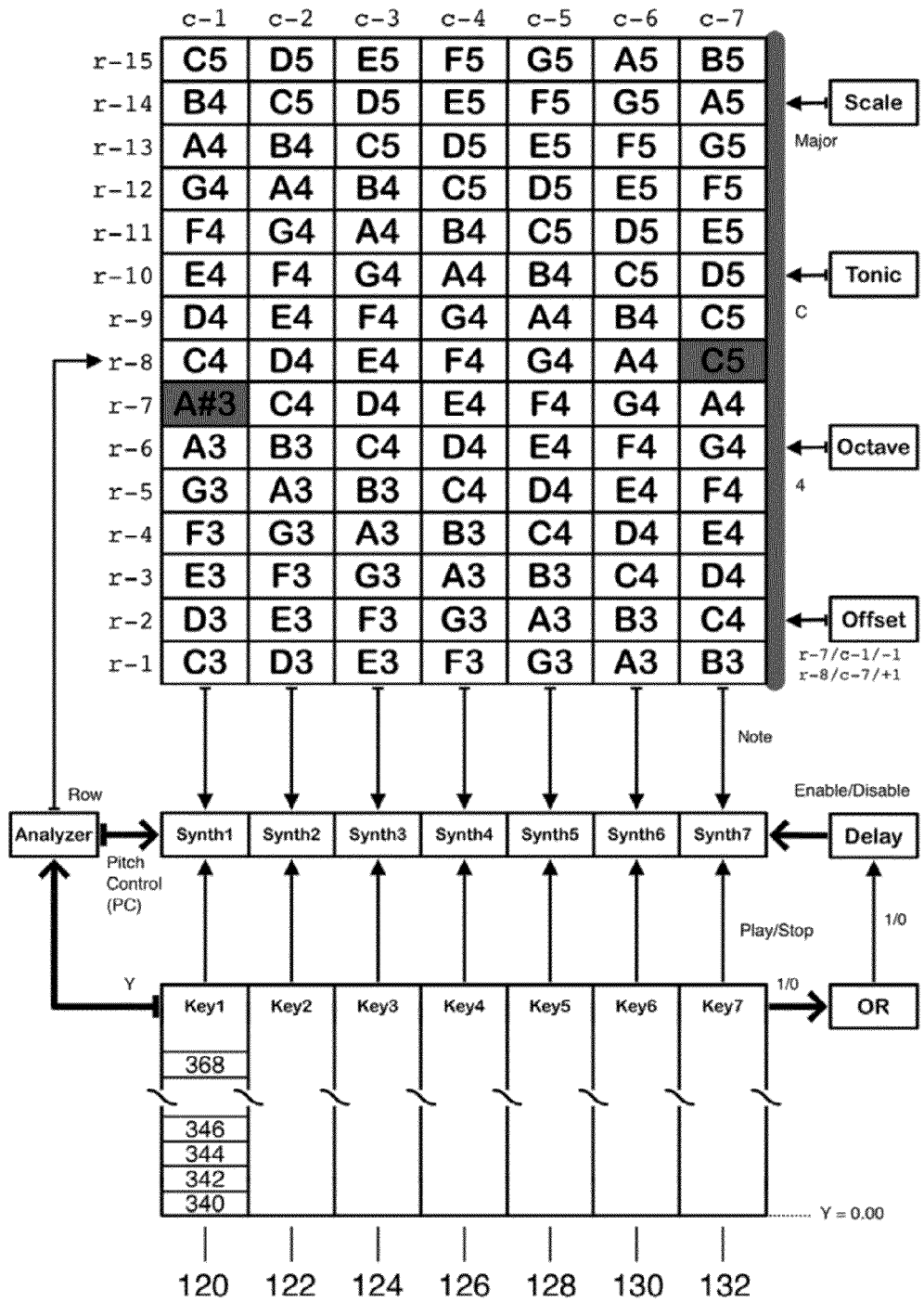
FIG. 4 is an operational diagram of the first keyboard embodiment shown in FIGS. 1, 2, and 3.

In FIG. 4, there is shown the operational logic of the above first embodiment 300. The symbols used in this figure are further explained in the following chart.

'OR' is set to a value of logical 0, and the output of the rising edge 'Delay' is set to a value of 'Disable' (logical 0) for the 7 synths, all of which are stopped and disabled from playing due to the values of 'Stop' and 'Disable' being input.

Pressing 'Key3' 124 causes it to then output a value of 'Play' (logical 1) to 'Synth3', which is currently loaded with a 'Note' of value 'E3', but it is also disabled, so it does not yet start playing. The 'Key3' 124 press also causes it to output a value of logical 1 to the 7-input 'OR', and to output the 'Y' value of the press point along that key to the 'Analyzer', which then internally latches the 'Y' value as the 'Y0' of 'Key3' 124, for comparison with future 'Y' values from 'Key3' 124. Upon its logical 1 input, the 7-input 'OR' outputs a value of logical 1, which triggers the rising edge 'Delay' to output a value of 'Enable' (logical 1) after a brief delay.

Additionally pressing 'Key5' 128 and 'Key7' 132 within the delay time interval causes each key to output a value of 'Play' to 'Synth5' and 'Synth7', respectively, each of which is currently loaded with a 'Note' of value 'G3' and 'B3', respectively, but they are also both disabled, so they do not yet start playing. The 'Key5' 128 and 'Key7' 132 presses also cause each key to output a value of logical 1 to the 7-input 'OR', and to additionally output the 'Y' value of its press to the 'Analyzer', which then internally latches that 'Y' value as the 'Y0' of that key, for comparison with future 'Y' values from that key.

If no other keys are pressed before the delay time interval has expired, upon expiration of such, the rising edge 'Delay' outputs a value of 'Enable' to each synth, which triggers the

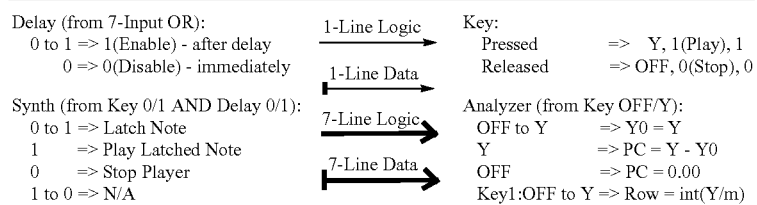

The operational logic is preset for the musical key 'Scale' selector to output a value of 'Major', the musical key 'Tonic' selector to output a value of 'C', and the center 'Octave' selector to output a value of '4', which presets the notes of row 'r-8', for columns 'c-1' through 'c-7', to the notes of the C major key, beginning with note 'C4', namely, C4, D4, E4, F4, G4, A4, and B4. Successive rows above and below r-8 are also preset with the notes of the C major key, but starting at notes successively above and below 'C4', respectively. The note 'Offset' selector is initially set to modify the note at 'r-8'/'c-7' by +1 semitone to 'C5', and the note at 'r-7'/'c-1' by −1 semitone to 'A#3'. This provides for the playing of custom chords arrangements, as well as for the playing of chords outside the C major key, both of which would not otherwise be possible.

The initial 'Row' value being output from the 'Analyzer' is internally preset to 'r-1' and is not user selectable. This 'Row' value causes the notes of 'r-1', namely, C3, D3, E3, F3, G3, A3, and B3, to be output to 'Synth1' through 'Synth7', respectively.

With "no keys being initially pressed" as the starting condition, 'Key1' 120 through 'Key7' 132 each outputs a value of 'Stop' (logical 0) to 'Synth1' through 'Synth7', respectively, a value of logical 0 to the 7-input 'OR', and a 'Y' value of 'OFF' to the 'Analyzer'. As a result, the output of the 7-input immediate latching and start of playing of notes 'E3', 'G3', and 'B3' corresponding to 'Synth3', 'Synth5', and 'Synth7', respectively, since those are the only synths inputting a 'Play' value from their corresponding key. This effectively plays an E minor chord.

Alternatively, if the pressing of 'Key1' 120 (at a 'Y' value corresponding to 'r-8') also occurs before the delay time interval has expired, this causes 'Key1' 120 to output a value of 'Play' to 'Synth1', which is currently loaded with a 'Note' of value 'C3', but it is also disabled, so it does not yet start playing. The 'Key1' 120 press also causes the key to output a value of logical 1 to the 7-input 'OR', and to output the 'Y' value of its press to the 'Analyzer', which internally latches that 'Y' value as the 'Y0' of that key, for comparison with future 'Y' values from that key, and which then outputs a 'Row' value of 'r-8' based on the 'Y' value output by 'Key1' 120. The 'Row' value 'r-8' causes notes 'C4', 'D4', 'E4', 'F4', 'G4', 'A4', and 'C5' to be output to 'Synth1' through 'Synth7', respectively, which are all disabled, so no playing occurs. Once the delay time interval has expired, the rising edge 'Delay' outputs a value of 'Enable' to all synths, which then triggers the immediate latching and start of playing of the notes 'C4', 'E4', 'G4', and 'C5' corresponding to 'Synth1', 'Synth3', 'Synth5', and 'Synth7', respectively, since those are the only synths inputting a 'Play' value from their corresponding key. This effectively plays a C major chord, with a root note of C4, and a doubling of the root note at C5.

While a key is being pressed, the 'Y' value of the press point along the key is continually updated and output to the 'Analyzer', where it is compared with the 'Y0' value latched for that key when it was initially pressed, and a 'Pitch Control' value 'Y-Y0' is output to the corresponding synth to control its pitch, thus providing a pitch modulation effect, similar to that of a guitar string bend, string slide, or whammy bar, which can be accomplished simply by sliding one's finger up and down along the key being pressed with that finger.

When a key is released (possibly 'Key1' 120), the output to its corresponding synth is set to a value of 'Stop, and if any key remains pressed, such that the 7-input 'OR' output is still set to logical 1, and the rising edge 'Delay' output is still set to 'Enable', thereby causing all synths to remain enabled, and playing if their corresponding key is pressed, then the synth corresponding to the released key is immediately stopped from playing. Further, the 'Y' output of the released key going to the 'Analyzer' is set to 'OFF'. If the released key is, in fact, 'Key1', the Y0 value for 'Key1' remains latched internally to the 'Analyzer', so the 'Row' output from the 'Analyzer' remains unchanged.

If a new key (other than 'Key1' 120) is pressed before all keys have been released, such that the 7-input 'OR' output is still set to logical 1 and the rising edge 'Delay' output is still set to 'Enable', then the output to its corresponding synth is set to a value of 'Play', and its output to the 7-input 'OR' is set to a logical 1, which causes the synth to latch and start playing the 'Note' corresponding to the newly pressed key, as determined by the current 'Row' value from the 'Analyzer', and by the column assignment of the pressed key.

If 'Key1' 120 had been released, and is newly pressed (at a 'Y' value corresponding to 'r-3') before all keys have been released, such that the 7-input 'OR' output is still set to logical 1, and the rising edge 'Delay' output is still set to 'Enabled', that 'Y' value is output to the 'Analyzer', where it is internally latched as the 'Y0' of 'Key1', for comparison with future 'Y' values from 'Key1' 120. At this same time, the 'Analyzer' outputs the corresponding 'Row' value of 'r-3', thereby causing that row of notes 'E3', 'F3', 'G3', 'A3', 'B3', 'C4', and 'D4' to be output to 'Synth1' through 'Synth7', respectively, immediately after which the 'Key1' 120 output to the already enabled 'Synth1' is set to a value of 'Play', thus causing 'Synth1' to latch its loaded 'Note' of value 'E3' and start playing it. The remaining synths whose corresponding keys are pressed, namely, 'Synth3', 'Synth5', and 'Synth7', continue playing their previously latched notes.

The 'Row' value of 'r-3' remains in effect until the next new 'Key1' 120 press. Thus, by newly pressing the same keys as before, namely, 'Key1' 120 (but now at a new 'Y' value corresponding to 'r-3', rather than 'r-8'), 'Key3' 124, 'Key5' 128, and 'Key7' 132, what previously played a modified C major chord, now plays an E minor 7th.

When all keys have been released, the outputs of 'Key1' 120 through 'Key7' 132, being input to 'Synth1' through 'Synth7', respectively, are reset to a value of 'Stop', which stops from playing any synth that had been playing just prior to the release, and the 'Y' outputs of 'Key1' 120 through 'Key7' 132, being input to the 'Analyzer', are reset to OFF, which then leaves the 'Row' output of the 'Analyzer' unchanged, such that subsequent key presses would be evaluated by restarting this logic from the "no keys being initially pressed" condition, but now beginning with the current 'Row' value being output from the 'Analyzer'.

Figure 5:
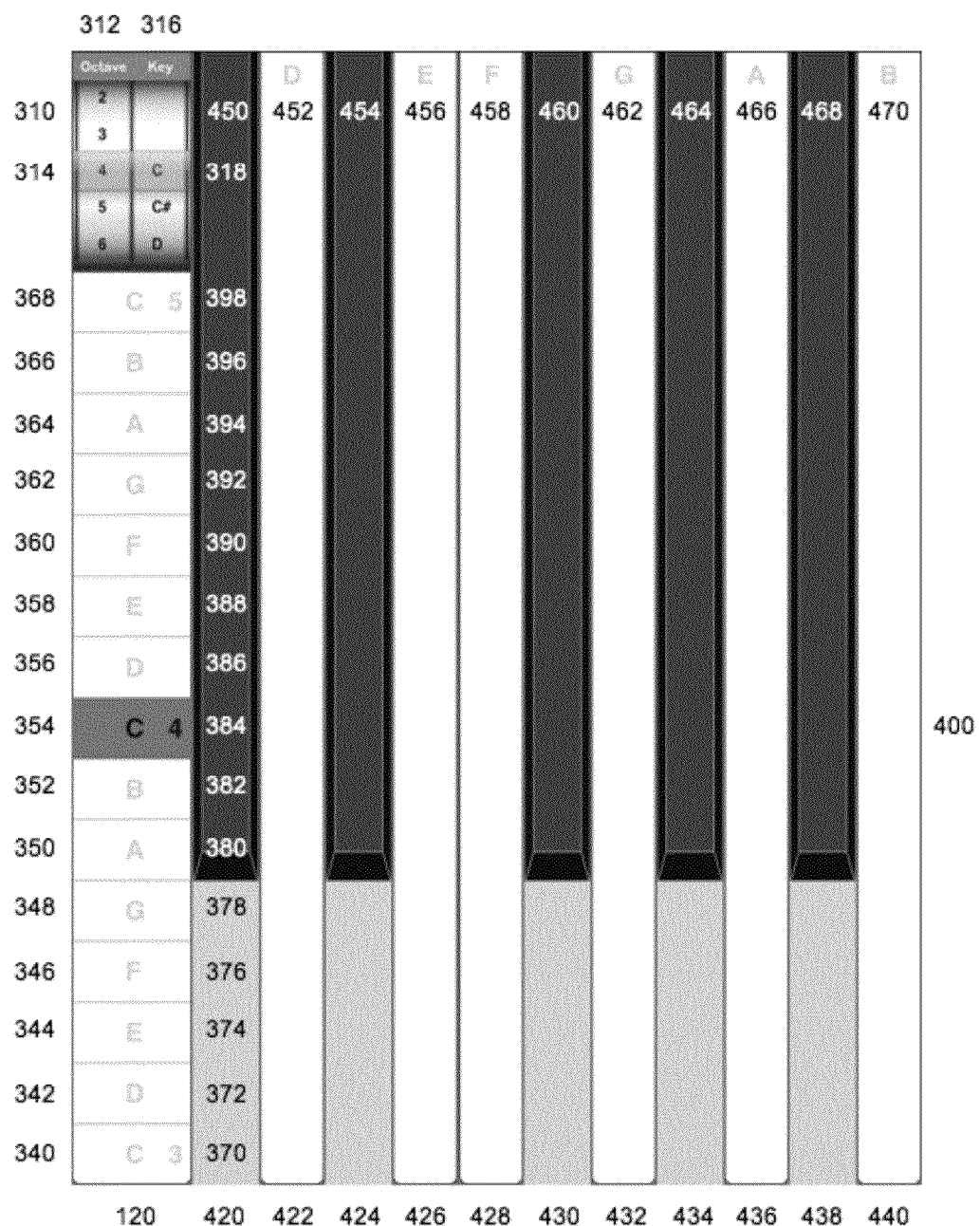
FIG. 5 is a top view of an operational state of a second embodiment of a piano-type, touchscreen keyboard of the invention.

A second embodiment of the invention is shown in FIG. 5 and is designated generally as 400. This embodiment is also illustrated in the form of an iPad piano-type, touchscreen keyboard, with attributes nearly identical to those of the above first embodiment (300 in FIGS. 1, 2, and 3). However, it is comprised of 11, non-sectioned, black and white keys 420, 422, 424, 426, 428, 430, 432, 434, 436, 438, and 440 in place of the 6 such white keys (322, 324, 326, 328, 330, and 332 in FIGS. 1, 2, and 3) of the above first embodiment (300 in FIGS. 1, 2, and 3).

The 11 black and white keys 420, 422, 424, 426, 428, 430, 432, 434, 436, 438, and 440 are equal to the length and 6/11 the width of the above replaced white keys (322, 324, 326, 328, 330, and 332 in FIGS. 1, 2, and 3) of the above first embodiment (300 in FIGS. 1, 2, and 3). The 11 black and white keys 420, 422, 424, 426, 428, 430, 432, 434, 436, 438, and 440 are further color coordinated with the 11 black and white keys immediately following a C-key on a piano. In this way, the operation of the sectioned first white key 120 and the pop-up data picker 310 are as described in the first embodiment (300 in FIGS. 1, 2, and 3), and the notes 384, 450, 452, 454, 456, 458, 460, 462, 464, 466, 468, and 470 of the total of 12 black and white keys 120, 420, 422, 424, 426, 428, 430, 432, 434, 436, 438, and 440 are the sequence of 12 notes (C4-C#-D-D#-E-F-F#-G-G#-A-A#-B) on a piano keyboard starting from left to right with the note (C4) 384 of the last touched section 354 of the sectioned first white key 120.

Figure 6:
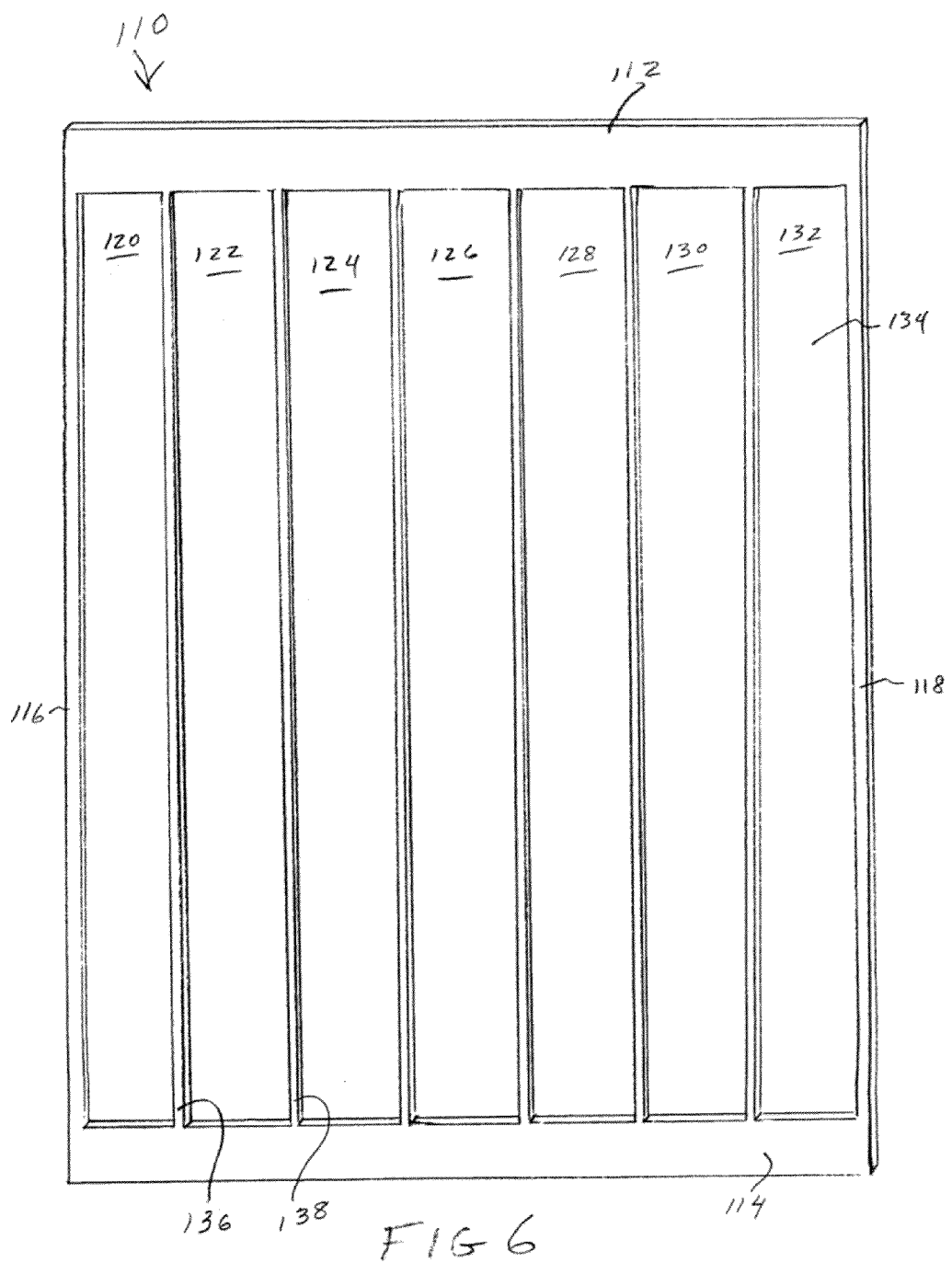
FIG. 6 is a perspective view of a first embodiment of an overlay of the invention.

Referring now to FIG. 6, there is shown a first embodiment of a screen overlay constructed in accordance with the principles of the present invention and designated generally as 110. The overlay 110 is comprised essentially of a flat sheet of plastic approximately $1/16^{th}$ of an inch thick, though this thickness may vary as desired. The overlay 110 has a top edge 112, a bottom edge 114 a left side edge 116 and a right side edge 118. The overlay is substantially rectangular in shape and has a size which is substantially equal to the face of the iPad or other device over which it is intended to be placed.

A plurality of vertically extending cutouts or windows such as shown at 120, 122, 124, 126, 128, 130 and 132 are formed in the sheet of material forming the overlay 110. These openings are essentially the same size and shape as the keys of the piano-type keyboard discussed above.

Figure 7:
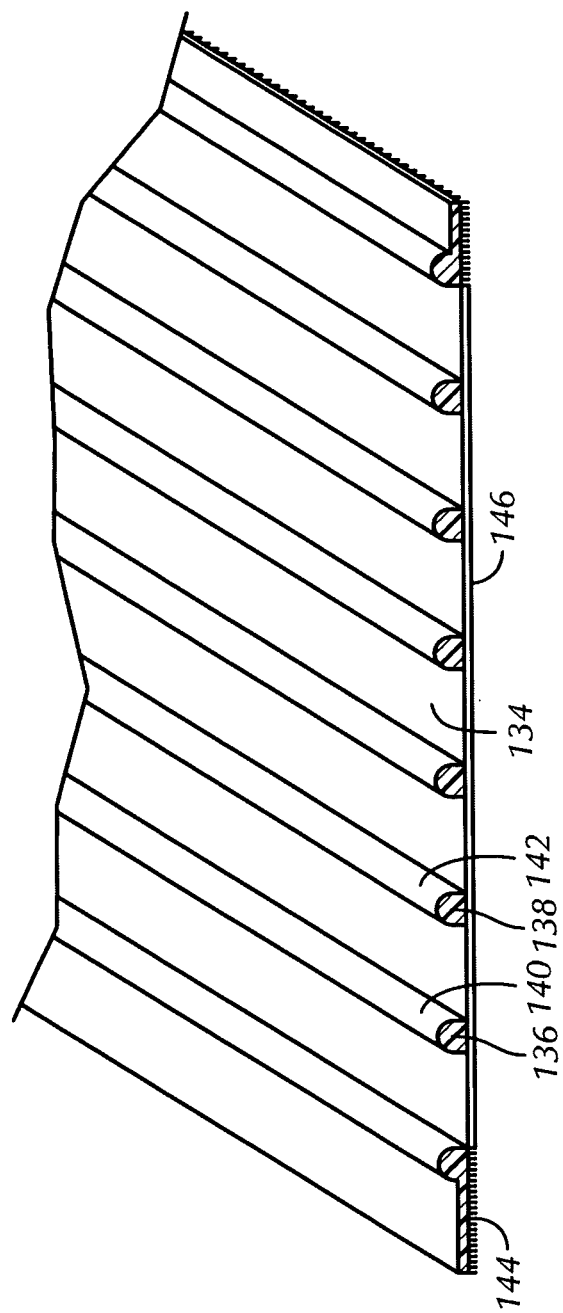
FIG. 7 is a partial cross-sectional view taken through the line 6-6 of FIG. 6.
Figure 8:
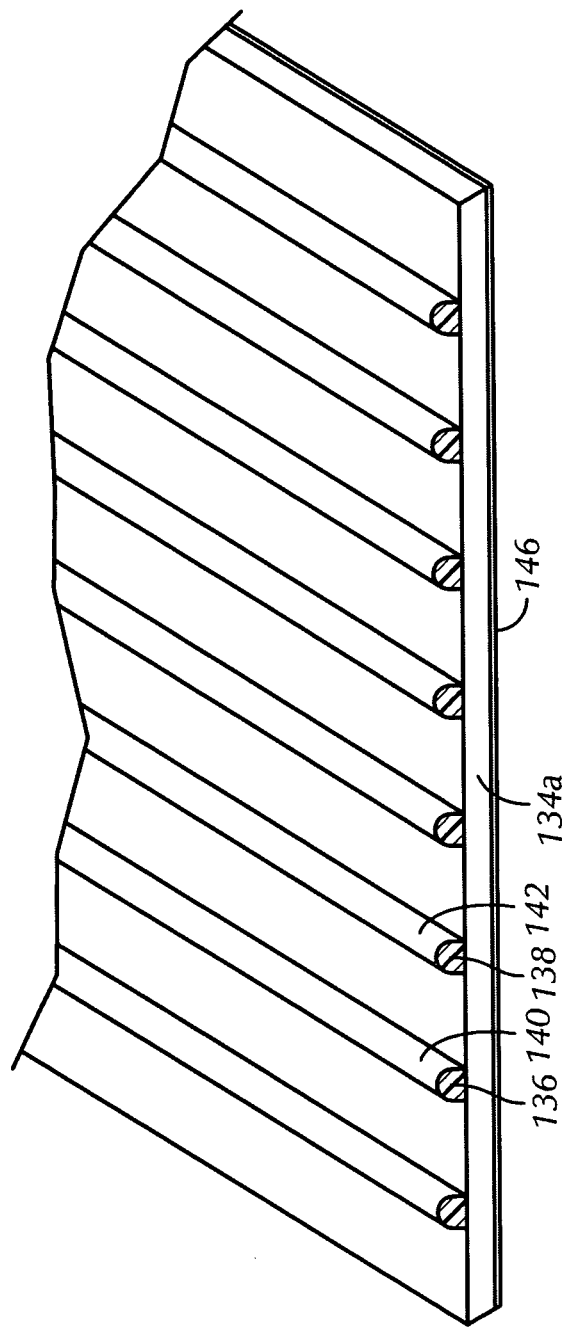
FIG. 8 is a second embodiment of a partial cross-sectional view taken through the line 6-6 of FIG. 6.

The centers of each of the openings 120-132 can either be left opened or can be closed by transparent or translucent sheet material of the type used for touch screen protective coverings, such as shown at 134 in FIG. 6 and FIG. 7. It is also possible to fill any of the centers of openings 120-132 with a foam material, such as shown in FIG. 7 at 144. Alternatively, the centers of openings 120-132 could be closed by a foam material of approximate thickness $1/16^{th}$ of an inch, such as shown in FIG. 8 at 134a, though this thickness may vary as desired. With these latter two cases, when a person utilizes the device, pressing a key would deform the foam 144/134a downwardly such that, only when the foam is sufficiently compressed, would touches be received by the touch screen, and only then would the key be activated. This added travel would give the device more of the feel of actually playing a piano key, and would prevent accidental key activation from weak, inadvertent touches that did not sufficiently compress the foam.

Ribs such as shown at 136 and 138 separate the various openings from each other. As shown most clearly in FIG. 8, and also in FIG. 7 for the case where the center of an opening 120-132 is not filled with foam 144, the upper edges of the ribs have curved tops such as shown at 140 and 142. That is, the ribs are essentially semi-circular in shape. As a result, the ribs help to guide a person's finger down into the opening between the ribs and overlying the keys. While ribs are the preferred way of separating the openings, other arrangements may work under some circumstances. In any event, a person using the device must be able to have a tactile feel for the areas that separate the openings. This can be accomplished by raising the areas, by roughening the surfaces thereof or by any similar means.

The screen overlay 110 could have a friction material or slight adhesive such as shown at 146 on the reverse side thereof so that it will adhere to the face of the iPad. Alternatively, it is possible to include magnets or other means for affixing the overlay 110 to the iPad.

Figure 9:
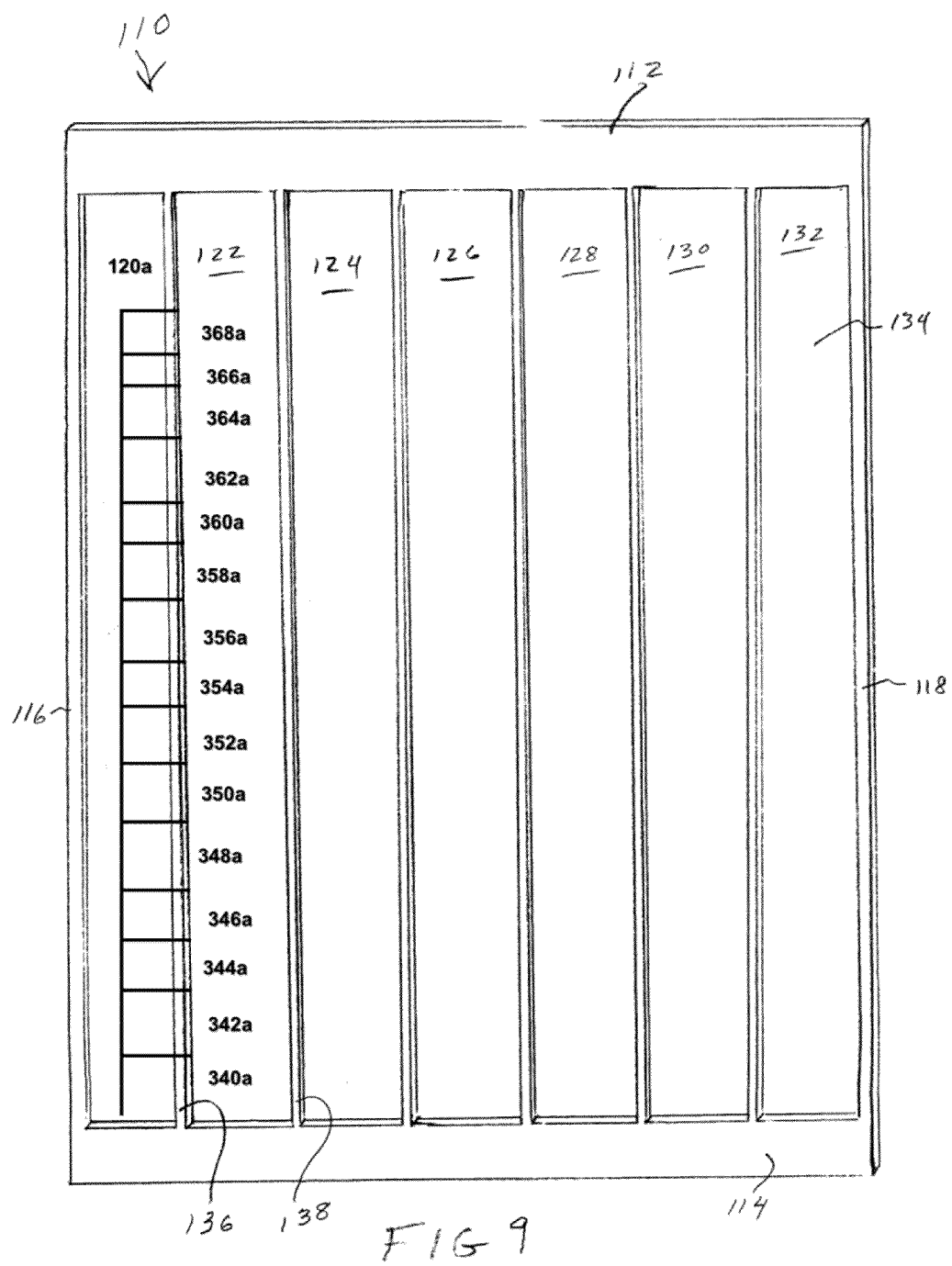
FIG. 9 is a perspective view similar to FIG. 6 but showing a second embodiment of an overlay of the invention.

In the embodiment shown in FIG. 9, overlay 110a is essentially identical to the overlay 110 shown in FIGS. 6-8, but with the opening shown at 120 in FIGS. 6-8 being replaced by the openings shown at 120a, 340a, 342a, 344a, 346a, 348a, 350a, 352a, 354a, 356a, 358a, 360a, 362a, 364a, 366a, and 368a in FIG. 9, and with the rib shown at 136 in FIGS. 6-8 being replaced by the rib shown at 136a in FIG. 9 to separate the openings 120a, 340a, 342a, 344a, 346a, 348a, 350a, 352a, 354a, 356a, 358a, 360a, 362a, 364a, 366a, and 368a from each other. Openings 340a-368a are essentially the same size and shape as the right half of the sections 340-368 of key 120 shown in FIGS. 1-5, and opening 120a is essentially the same size and shape as key 120 shown in FIGS. 1-5, but with a portion of the key 120 shape equivalent to the total size and shape of openings 340a-368a taken together with rib 136a, as shown in FIG. 9, being removed. The purpose of the opening 120a is to enable the user to easily slide their finger along the length of that opening in order to emulate the string stretching, whammy bar, and fretless neck techniques of guitar and bass playing, as described above; however, it should be obvious that openings 340a-368a could also have been sized essentially the entire width of the sections 340-368 of key 120 in FIGS. 1-5, should such emulation not be required.

Figure 10:
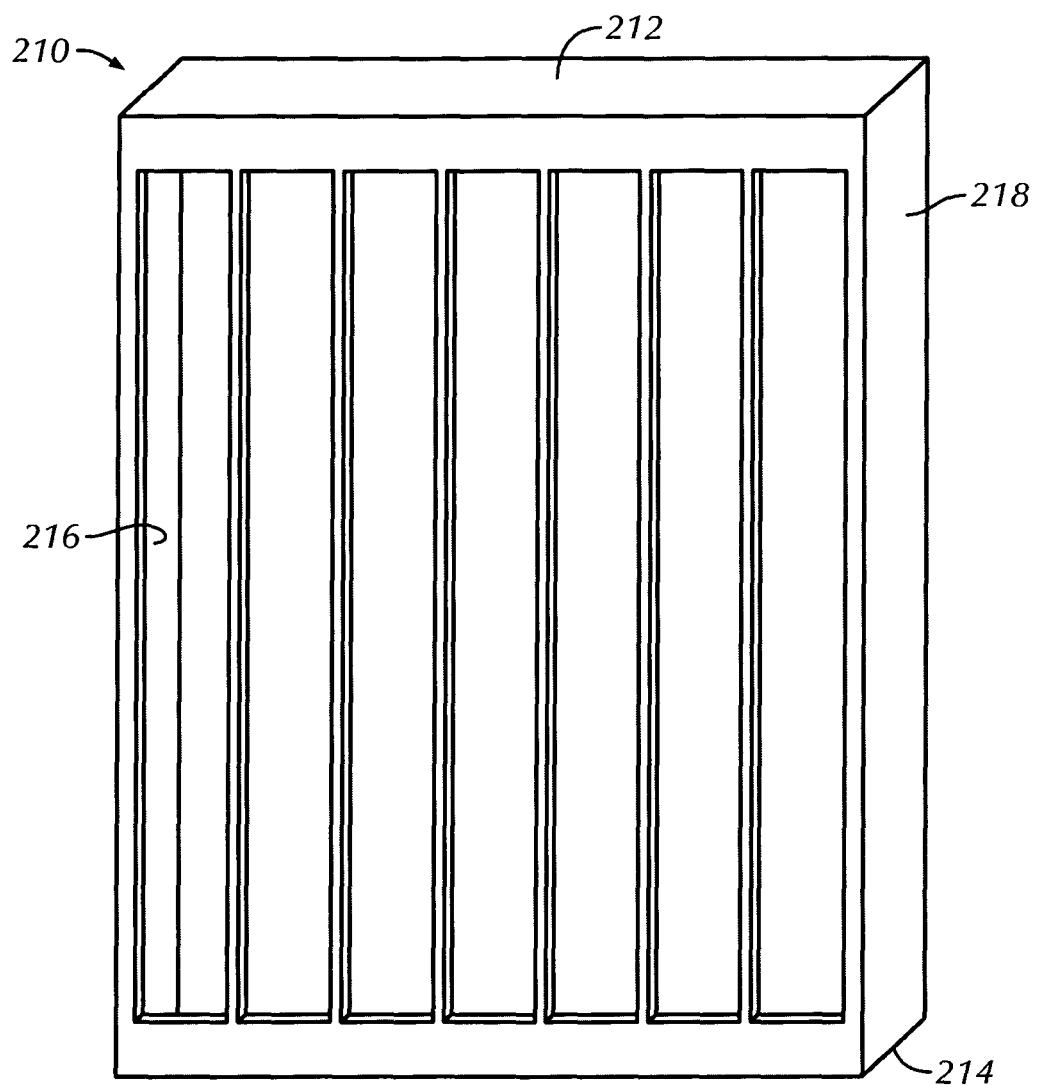
FIG. 10 is a perspective view similar to FIG. 6 but showing a third embodiment of an overlay of the invention.

In the embodiment shown in FIG. 10, the overlay 210 can include partial or full top and bottom walls 212 and 214 and partial or full side walls 216 and 218. These walls are dimensioned so as to be able to fit around the top, bottom and side edges of the iPad or similar device. In this way, the overlay 210 can be held in place on the iPad.

The present invention may be embodied in other specific forms without departing from the spirit or essential attributes thereof and accordingly, reference should be made to the appended claims rather than to the foregoing specification as indicating the scope of the invention.

I claim:

1. A piano-type keyboard apparatus including:
    a plurality of piano-type keys, each of said keys having a length;
    one of said piano-type keys being designated a detection key and including touch detection means for detecting the point of touch along the length thereof, and
    control means for controlling a function of said piano-type keys in response to said touch detection means.

2. The piano-type keyboard apparatus as claimed in claim 1 where said function control includes means for the setting of the musical pitches of at least some portion of said piano-type keys.

3. The piano-type keyboard apparatus as claimed in claim 1 where at least some portion of such touch points so detected on said detection key are each associated with some musical pitch.

4. The piano-type keyboard apparatus as claimed in claim 1 where upon such touch point detection the musical pitch of said detection key is set to the musical pitch so associated with said touch point.

5. The piano-type keyboard apparatus as claimed in claim 1 where the musical pitches of at least some of said piano-type keys in proximity to said detection key are set in accordance with the musical pitches of a similar portion of piano keyboard keys in similar proximity to the piano key whose musical pitch relatively corresponds with said detection key musical pitch.

6. The piano-type keyboard apparatus as claimed in claim 2 further including at least one pitch selection means to select the musical pitches to be so associated with said touch points.

7. The piano-type keyboard apparatus as claimed in claim 6 wherein said musical pitch selection relates to at least one musical key.

8. The piano-type keyboard apparatus as claimed in claim 7 wherein said musical pitch selection relates to at least one musical octave.

9. The piano-type keyboard apparatus as claimed in claim 7 wherein said musical pitch selection relates to at least one musical note.

10. The piano-type keyboard apparatus as claimed in claim 7 wherein said musical pitch selection is in some part in accordance with one or more musical cents.

11. The piano-type keyboard apparatus as claimed in claim 1 wherein at least a portion of said piano-type keys can function as piano-type touch screen keys.

* * * * *